United States Patent
Huang et al.

(10) Patent No.: US 11,142,656 B2
(45) Date of Patent: Oct. 12, 2021

(54) ELECTROPHORETIC COATING AND PREPARATION METHOD, ELECTROPHORETIC COATING PROCESS AND SELECTIVE PLATING PROCESS

(71) Applicants: Tyco Electronics (Shanghai) Co. Ltd., Shanghai (CN); Tyco Electronics AMP Shanghai Ltd., Shanghai (CN)

(72) Inventors: Zhongxi Huang, Shanghai (CN); Jiankun Zhou, Shanghai (CN); Jinlong Li, Shanghai (CN); Guoping Zhang, Shanghai (CN)

(73) Assignees: Tyco Electronics (Shanghai) Co. Ltd., Shanghai (CN); Tyco Electronics AMP Shanghai Ltd., Shanghai (CN)

( * ) Notice: Subject to any disclaimer, the term of this patent is extended or adjusted under 35 U.S.C. 154(b) by 742 days.

(21) Appl. No.: 15/411,446

(22) Filed: Jan. 20, 2017

(65) Prior Publication Data
US 2017/0204277 A1 Jul. 20, 2017

(30) Foreign Application Priority Data

Jan. 20, 2016 (CN) .......................... 201610037239.5
Apr. 21, 2016 (CN) .......................... 201610251253.5

(51) Int. Cl.
| | |
|---|---|
| *C09D 5/44* | (2006.01) |
| *C09D 161/06* | (2006.01) |
| *C08G 8/10* | (2006.01) |
| *C09D 165/00* | (2006.01) |
| *C25D 13/04* | (2006.01) |
| *C09D 5/00* | (2006.01) |
| *C25D 13/12* | (2006.01) |
| *C25D 7/00* | (2006.01) |
| *C25D 5/02* | (2006.01) |

(52) U.S. Cl.
CPC .............. *C09D 5/4419* (2013.01); *C08G 8/10* (2013.01); *C09D 5/008* (2013.01); *C09D 5/4469* (2013.01); *C09D 161/06* (2013.01); *C25D 5/022* (2013.01); *C25D 7/00* (2013.01); *C25D 13/12* (2013.01)

(58) Field of Classification Search
None
See application file for complete search history.

(56) References Cited

U.S. PATENT DOCUMENTS

| | | | | |
|---|---|---|---|---|
| 3,585,120 A | * | 6/1971 | Wehrmann et al. | C25D 7/04 204/479 |
| 4,028,284 A | * | 6/1977 | Hirai | B01J 45/00 521/39 |
| 4,045,397 A | * | 8/1977 | Parkinson | C09D 11/103 524/262 |
| 5,500,106 A | * | 3/1996 | Goldberg | C25D 5/54 205/163 |
| 5,665,496 A | * | 9/1997 | Omika | |
| 5,670,287 A | * | 9/1997 | Kawata | |
| 5,932,631 A | * | 8/1999 | Marritt | C09D 11/30 106/31.13 |
| 2003/0216487 A1 | * | 11/2003 | Rader | |
| 2009/0011199 A1 | * | 1/2009 | Isono | |
| 2010/0055851 A1 | * | 3/2010 | Lee | H01L 29/66765 438/158 |
| 2013/0008695 A1 | * | 1/2013 | Morita | C08G 59/245 174/250 |
| 2013/0143162 A1 | * | 6/2013 | Hatakeyama | C08L 65/00 430/296 |
| 2014/0030652 A1 | * | 1/2014 | Senzaki | C08L 53/00 430/270.1 |

FOREIGN PATENT DOCUMENTS

GB 1166249 A * 10/1969 ........... C08G 63/553

* cited by examiner

*Primary Examiner* — Salil Jain
(74) *Attorney, Agent, or Firm* — Barley Snyder

(57) ABSTRACT

An electrophoretic coating is disclosed. The electrophoretic coating comprises an aqueous medium and a charged film-forming resin dispersed in the aqueous medium. The film-forming resin is acid-insoluble and alkali-soluble.

20 Claims, No Drawings

ELECTROPHORETIC COATING AND PREPARATION METHOD, ELECTROPHORETIC COATING PROCESS AND SELECTIVE PLATING PROCESS

CROSS-REFERENCE TO RELATED APPLICATIONS

This application claims the benefit of the filing date under 35 U.S.C. § 119(a)-(d) of Chinese Patent Application No. 201610251253.5, filed on Apr. 21, 2016, and Chinese Patent Application No. 201610037239.5, filed on Jan. 20, 2016.

FIELD OF THE INVENTION

The present invention relates to a coating and a coating process, and more particularly, to a coating and a coating process applicable to electrical devices.

BACKGROUND

The high cost of precious metals such as gold and palladium has driven the development of selective plating techniques in which plating is conducted only in a needed area. The selective plating process comprises: firstly applying a protective coating layer on a metal substrate, curing it by heating, following by stripping the coating layer in a manner of laser ablation from an area to be plated, and then plating a precious metal. A precious metal, for example gold, will be plated in the selective area exposed after laser ablation, and other areas are still protected by the coating layer. After plated with gold, the product is treated in a stripping solution to remove the remaining coating layer. Such a process may precisely control the plated area and the size thereof so that a large amount of precious metal is saved.

The coating layer in the selective plating process is usually applied using a transfer printing process, which is more suitable for connector terminals with a simple profile. However, with the development of smaller and more complicated electrical connectors, connector terminals become smaller and structures of the electrical connectors become more complicated. The current transfer printing and gel masking processes cannot satisfy requirements for the plating of small, complex terminals. Meanwhile, it is difficult for typical coatings to be rapidly stripped by a method using a non-organic solvent, which hinders the application of selective plating.

Electrophoretic coatings have been widely used in corrosion-resistant coating layers and decorative coating layers for metal members due to ease of application, environmental friendliness, and uniformity of the coating layer. Electrophoretic coatings have strong binding force to a substrate and excellent corrosion-resistant property. All of these are of permanent protection. At present, widely used electrophoretic coatings mainly include epoxy electrophoretic coatings and acrylic electrophoretic coatings.

There is a demand for temporary protection in the industry, for example, a demand for a temporary plating protective coating layer with corrosion resistance, solvent resistance, surface oxidization resistance, etc. This requires that the coating layer can be rapidly and conveniently removed after the object of protection is achieved. Typical methods include laser ablation, stripping by mechanical force, and stripping by solvent soaking. For products with complex shape to which a force is not easily applied, coating layers are typically stripped by solvent soaking. However, neither current electrophoretic coatings nor other types of coatings can be easily stripped with solvent, and a long soaking time of tens of minutes or more is usually required. Therefore, the production efficiency is greatly influenced.

SUMMARY

An object of the invention, among others, is to provide an electrophoretic coating capable of being uniformly applied to electrical devices of small size and complex structure and rapidly stripped after plating. The disclosed electrophoretic coating comprises an aqueous medium and a charged film-forming resin dispersed in the aqueous medium. The film-forming resin is acid-insoluble and alkali-soluble.

DETAILED DESCRIPTION OF THE EMBODIMENT(S)

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete, and will fully convey the concept of the invention to those skilled in the art.

Unless otherwise specified, all numerals used in the description and the claims for expressing the characteristic sizes, numbers and physicochemical characteristics should be understood to be modified by a term "about" under all conditions. Therefore, unless specified to the contrary, the numerical value parameters listed in the description and the appended claims are approximate values, those skilled in the art can seek to obtain desired properties by means of the teaching contents disclosed herein and appropriately change these approximate values. The application of a numerical value range expressed by an endpoint includes all digitals within the range and any range within the range, for example, 1 to 5 includes 1, 1.1, 1.3, 1.5, 2, 2.75, 3, 3.80, 4, 5, and the like.

An electrophoretic coating, an electrophoretic coating process, and a selective plating process of the present invention are described in greater detail below.

The electrophoretic coating has a film-forming resin and an aqueous medium.

The film-forming resin is a charged resin so as to be used for electrophoretic coating, and the film-forming resin is acid-insoluble and alkali-soluble. Due to being capable of performing electrophoretic coating, the film-forming resin may be used to coat electronic devices with complex shape and smaller size, for example metal terminals. Moreover, due to the acid-insoluble and alkali-soluble properties, the coating layer formed by the film-forming resin of the present disclosure can resist the erosion of acid in the process of selective (precious metal) plating and can be rapidly stripped by washing with an inorganic alkaline solution after plating.

The film-forming resin has a negatively charged phenolic hydroxy group, for example, the film-forming resin may be an unmodified phenolic resin. The phenolic resin useful in the present disclosure is not required to be subjected to a modification treatment of introducing a carboxyl group or an amino group into the molecular chain, but may be an unmodified "pure" phenolic resin. Typically, in order to improve the charging property of a phenolic resin (so as to perform electrophoresis), the phenolic resin is usually subjected to a reaction with maleic anhydride, a grease, or the like to introduce a carboxyl group or an amino group into the molecular structure. However, in the present disclosure, a water-soluble phenolic resin, which is negatively charged in nature, may be used, or for an uncharged linear phenolic resin with weak acidity, it may be negatively charged by subjecting to a neutralization treatment with a strong alkali. Such a negatively charged "pure" phenolic resin can be rapidly coated by electrophoresis to form an acid-resistant protective coating layer without crosslinking agent. Furthermore, the coating layer formed may have a smaller thickness, for example 0.5 to 3 μm, and may be cured by drying in a shorter time, for example 2 minutes or less.

The molecular weights of the linear phenolic resin and the water-soluble phenolic resin may be 1000 or more, for example about 10000. Such linear phenolic resin and water-soluble phenolic resin may be commercially available.

In some embodiments, the content of the film-forming resin in the electrophoretic coating is in a range of 3% to 15% by weight. With a content of the film-forming resin being 3% or more, it can ensure the formation of an electrophoretic coating layer in a short time. With a content of film-forming resin being 15% or less, the possible problem of precipitation of the film-forming resin due to insufficient solubility may be prevented. The content of the film-forming resin in the electrophoretic coating may be in a range of 5-15% by weight or in a range of 5-10% by weight.

The aqueous medium is used to disperse the film-forming resin to form a stable aqueous dispersion or a colloidal solution. The use of an aqueous medium with water being a main solvent enables the electrophoretic coating process of the present disclosure and the subsequent procedure of stripping the coating layer to be more environmentally friendly and less toxic.

The aqueous medium may comprise water and a water-miscible solvent. The water-miscible solvent may improve the dispersibility of the film-forming resin in water. The water-miscible solvent is an alcohol solvent and an ether solvent. To improve the water solubility and the stability of the film-forming resin, an aliphatic alcohol, for example a C2-C6 alkyl alcohol, including ethanol, isopropanol, etc., may be used as the alcohol solvent. A polyol monoether, for example an aliphatic diol monoether, including ethylene glycol monobutyl ether, ethylene glycol monomethyl ether, propylene glycol monomethyl ether, ethylene glycol phenyl ether, etc., may be used as the ether solvent.

The amount of the water-miscible solvent and the ratio of the water-miscible solvent to water may be determined according to the properties of the film-forming resin used. With respect to a linear phenolic resin or a water-soluble phenolic resin, the weight ratio of the water-miscible solvent to the phenolic resin is typically in a range of 2:1 to 4:1 so as to provide sufficient water solubility and stability for the phenolic resin. Furthermore, the ratio of the water-miscible solvent to water is typically in a range of 10:90 to 30:70.

The water-miscible solvent may be used alone or in combination. In the case of using two or more kinds of water-miscible solvents in combination, for example in the case of using an alcohol solvent and an ether solvent in combination, the ratio between the two kinds of solvents may be 3:1 to 10:1.

Since a charged acid-insoluble and alkali-soluble film-forming resin, in particular a negatively charged phenolic resin, is used in the electrophoretic coating of the present disclosure, a crosslinking agent, which is generally used for accelerating the crosslinking of the electrophoresis resin to form a film, is not needed. In order to ensure the film-forming resin is charged, the electrophoretic coating may contain a pH adjusting agent to control the overall pH value. For example, in the case of using a phenolic resin, the pH value of the electrophoretic coating may be controlled in an alkaline range, for example a range of greater than 7 to less than or equal to 11, or, for example, 8-10. The pH adjusting agent may be an alkaline substance, for example a hydroxide, aqueous ammonia, an alkaline organic amine, and a mixture thereof, wherein the hydroxide includes an alkali metal hydroxide, an alkali earth metal hydroxide, etc.

The electrophoretic coating may also contain some auxiliary components, for example, a pigment which is used for significantly distinguishing a coated area from an uncoated area, etc.

The electrophoretic coating may be prepared by dispersing the acid-insoluble and alkali-soluble film-forming resin in the aqueous medium, wherein the film-forming resin is in a charged state and stably dispersed in the aqueous medium. The method for preparing the electrophoretic coating specifically comprises: (1) dispersing the film-forming resin in the aqueous medium comprising water and a water-miscible solvent to form a dispersion of the film-forming resin, and optionally, adjusting the pH value of the film-forming resin dispersion with a pH adjusting agent; and (2) mixing the film-forming resin dispersion with a mixed solvent of water and a water-miscible solvent.

The film-forming resin dispersion may be a dispersion in water or may be a dispersion in a water-miscible solvent. The mixing of the film-forming resin dispersion with the aqueous medium is performed with stirring so as to sufficiently disperse the film-forming resin. After mixing, a stable electrophoretic coating may be obtained by standing and aging for a period of time.

In an exemplary embodiment of the electrophoretic coating, a linear phenolic resin electrophoretic coating is formulated as follows. 40 g of a linear phenolic resin is dissolved in 60 ml of isopropanol, and an alkaline solution formulated from 2.0 g KOH/10 ml isopropanol and 40 ml water is added to obtain an electrophoretic coating stock solution. The electrophoretic coating stock solution is added to a mixed liquid formulated from 30 ml isopropanol+10 ml ethylene glycol monobutyl ether+400 ml deionized water with stirring. The molecular formula of the linear phenolic resin is shown as follows, with a molecular weight being about 14000.

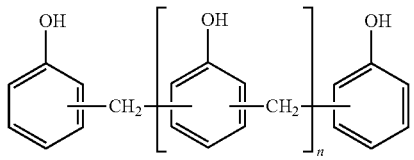

In another exemplary embodiment of the electrophoretic coating, a water-soluble phenolic resin electrophoretic coating is formulated as follows. 43 g of a water-soluble phenolic resin solution (an aqueous solution with 77% solid content) is added to 20 ml isopropanol and 20 ml deionized water; and this solution is then added to a mixed solvent formulated from 25 ml isopropanol, 10 ml ethylene glycol monobutyl ether, and 400 ml deionized water with stirring. The molecular formula of the water-soluble phenolic resin is shown as follows, with a molecular weight being about 9000.

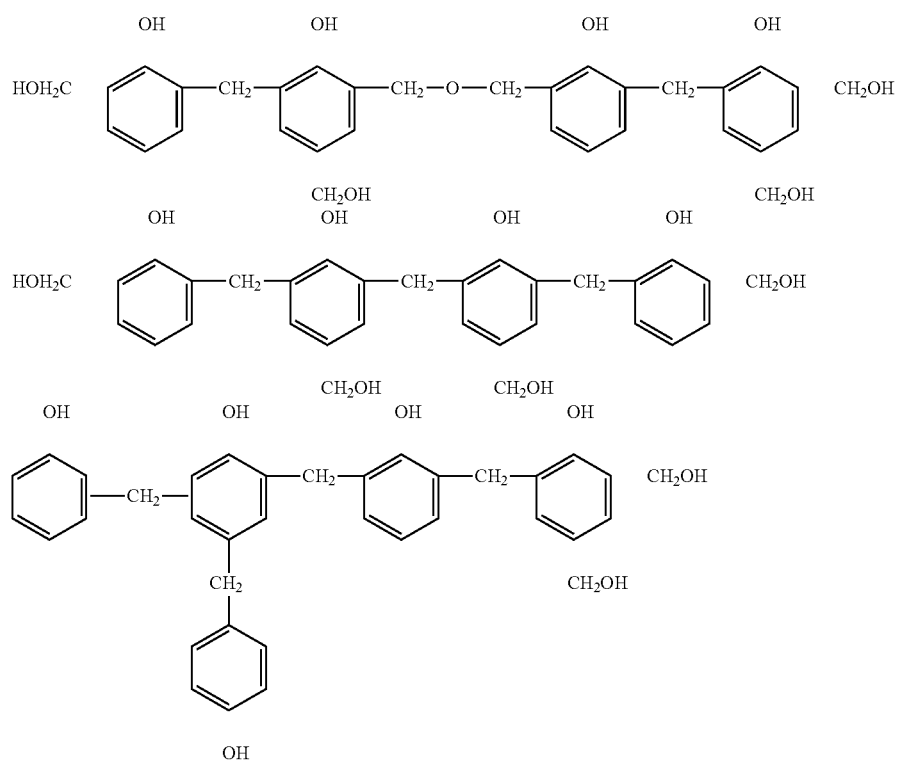

In the electrophoretic coating process of the present invention, the electrophoretic coating described above is used as an anodic electrophoretic coating, and upon electrophoresis, a coating layer is formed on a member or substrate which is used as an anode during the electrophoresis.

The conditions of electrophoretic coating process are not limited in the present disclosure, and conventional conditions of electrophoretic coating may be employed. For example, the electrophoretic coating of the present disclosure described above is used, the member to be electrophoresed is used as an anode, a stainless steel plate or a titanium mesh/plate is used as a cathode, the voltage is 5 to 50 V, the temperature is 10 to 30° C., and the time is 10 seconds to 5 minutes. After washing (for example, washing with water), the coating layer formed by electrophoretic coating is cured by drying at a temperature of 80 to 160° C., and the thickness thereof may be 0.1 μm to 25 μm, 0.2 μm to 10 μm, or 0.3 μm to 3 μm.

In the present invention, because a charged acid-insoluble and alkali-soluble film-forming resin is used in the electrophoretic coating, the time of electrophoretic coating may be shortened and a thin and uniform coating layer may be formed within a time period no longer than 5 minutes, for example no longer than 2 minutes, or no longer than 1 minute. Further, because the film-forming resin of the present disclosure may form an acid-resistant paint film without a crosslinking agent and crosslinking reaction, only drying is required after electrophoretic coating, and the drying time may also be greatly shortened, for example no longer than 10 minutes, no longer than 5 minutes, or no longer than 2 minutes; a conventional electrophoretic coating process needs a curing reaction time of at least about 30 minutes.

The film-forming resin of the present invention further is alkali-soluble, so that the electrophoretic coating layer formed may be stripped by washing with an alkaline solution. In particular, it may be stripped with an inorganic alkaline solution (for example, aqueous sodium hydroxide solution) in a short time. This avoids the use of organic solvents which are harmful to the environment and human bodies, and enables the production process to be more environmentally friendly and less toxic.

In an exemplary embodiment of the electrophoretic coating process, a board-to-board connector terminal (hereinafter, "BTB terminal") is taken as an anode, a stainless steel plate is taken as a cathode, and the linear phenolic resin coating formulated as described above is used as an electrophoretic coating. The phenolic resin electrophoretic coating is applied onto a terminal to be plated at room temperature at a voltage of 7.5 V for 30 s. The coating layer formed is washed with water, and then dried and cured by heating to 80-160° C. for about 1 minute, and a coating layer of 0.3 μm to 3 μm is formed. A uniform phenolic resin coating layer is formed via electrophoretic coating.

The coating layer is stripped by soaking the part of the above BTB terminal coated with the phenolic resin in 2% NaOH solution for 8 seconds.

Similarly, the water-soluble phenolic resin coating described above may be used as an electrophoretic coating with the same electrophoretic coating and coating layer stripping processes as described with respect to the linear phenolic resin coating.

The selective plating process of the present invention comprises steps of: forming a protective coating layer in a non-plated area on a plated surface of a substrate by electrophoretic coating; plating; and stripping the protective coating layer after plating.

The plated substrate may be a metal substrate, for example a metal surface of an electronic device. The plated surface may be a flat surface, or may be a surface having a complex shape and/or a fine structure. In some embodiments, the plating may be precious metal plating, and said precious metal is gold or palladium.

The protective coating layer may be formed in the non-plated area by using various methods, for example, a method of first forming a protective coating layer on a substrate by electrophoretic coating and then stripping the protective coating layer from an area to be plated, or a method of forming a protective coating layer on a surface of a substrate having a mask thereon by electrophoretic coating and then removing the mask.

In the present invention, since an acid-insoluble and alkali-soluble film-forming resin is used as an electrophoretic coating, the stripping of the protective coating layer may be readily achieved by washing with an alkaline solution, in particular an inorganic alkaline solution (for example, aqueous sodium hydroxide solution). Particularly, in the case of using a phenolic resin, since a thin and uniform electrophoretic coating layer may be formed, this coating layer can be easily washed off with an inorganic alkaline solution in a short time. For example, a diluted alkali metal hydroxide solution may be used to strip the phenolic resin coating layer within 5 minutes, 2 minutes, 1 minute, or even 10 seconds.

In an exemplary embodiment of the selective plating process, a multibeam connector terminal to be applied is used as an anode, a stainless steel plate is used as a cathode, and the linear phenolic resin coating described above is used as an electrophoretic coating. The phenolic resin electrophoretic coating is applied onto a terminal to be plated at room temperature at a voltage of 10 V for 30 s. The coating layer formed is washed with water, and then is dried and cured by heating to 80-160° C. for about 1 minute, and a coating layer of 0.3 μm to 3 μm is formed. The area or pattern to be plated with precious metal is obtained by laser treatment and then is plated with gold. After which, the remaining protective coating layer was stripped in a 2% NaOH solution. A selectively plated terminal product was thus obtained. The phenolic resin electrophoretic coating layer described above is not peeled in the plating solution at 60° C. for 3 min, but is very easily stripped in a diluted alkaline solution.

Advantageously, according to the electrophoretic coating of the present invention as well as the electrophoretic coating process and the selective plating process using the same, the electrophoretic coating is suitable for coating more complex and smaller terminals, has a high coating speed, and is capable of achieving coating effects which cannot be reached by other processes. Furthermore, the coating layer formed is more uniform, the thickness of the coating layer can be controlled well, the temporary protective coating can be ablated with laser more easily, and the temporary protective coating is resistant to the erosion of plating solution. Additionally, the coating layer after plating can be very easily stripped in a diluted alkaline solution and the whole process including coating, using and striping is more environmentally friendly and less toxic, since water is used as a solvent in the electrophoretic coating.

What is claimed is:

1. An electrophoretic coating capable of being applied to an object, comprising:
   an aqueous medium including water; and
   a film-forming water-soluble phenolic resin having a negatively charged phenolic hydroxy group and adapted to be substantially dissolved in the water, the film-forming resin consisting essentially of an acid-insoluble and alkali-soluble, unmodified phenolic resin not subjected to a modification treatment introducing a carboxyl group or an amino group into a molecular chain of the film-forming resin, wherein the coating does not include a modified resin.

2. The electrophoretic coating of claim 1, wherein the electrophoretic coating does not use a crosslinking agent in its formation.

3. The electrophoretic coating of claim 1, wherein the phenolic resin comprises a linear phenolic resin.

4. The electrophoretic coating of claim 1, wherein the content of the film forming resin in the electrophoretic coating is in a range of 3% to 15% by weight.

5. The electrophoretic coating of claim 1, further comprising a pH adjusting agent including an alkaline substance for controlling the pH value of the electrophoretic coating in the alkaline range for negatively charging the film-forming resin.

6. The electrophoretic coating of claim 5, wherein the alkaline substance of the pH adjusting agent comprises a mixture of a hydroxide, aqueous ammonia and an alkaline organic amine for controlling the pH value of the electrophoretic coating to be greater than 7 to less than or equal to 11.

7. The electrophoretic coating of claim 1, wherein the aqueous medium further includes a water-miscible solvent.

8. The electrophoretic coating of claim 7, wherein a volume ratio of the water-miscible solvent to water being in a range of 10:90 to 30:70.

9. The electrophoretic coating of claim 7, wherein the water-miscible solvent is an aliphatic diol monoether solvent.

10. The electrophoretic coating of claim 7, wherein the water-miscible solvent comprises an alcohol solvent.

11. The electrophoretic coating of claim 10, wherein the alcohol solvent is a C2-C6 alkyl alcohol.

12. The electrophoretic coating of claim 1, wherein the film-forming resin comprises a molecular weight greater than or equal to approximately 9,000.

13. The electrophoretic coating of claim 12, wherein the film-forming resin comprises a molecular weight between approximately 9,000 and 14,000.

14. The electrophoretic coating of claim 12, wherein the film-forming resin comprises a molecular weight of approximately 10,000.

15. An electrophoretic coating capable of being applied to an object, comprising:
   an aqueous medium including water, a water-miscible alcohol solvent and a water-miscible ether solvent;
   a film-forming resin having a negatively charged phenolic hydroxy group and dispersed in the aqueous medium, the film-forming resin being a water soluble, acid-insoluble and alkali-soluble, unmodified linear phenolic resin not subjected to a modification treatment introducing a carboxyl group or an amino group into a molecular chain of the film-forming resin, the film-forming resin comprising a molecular weight greater than or equal to approximately 9,000 with the content of the film forming resin in the electrophoretic coating being in a range of 3% to 15% by weight; and
   a pH adjusting agent including an alkaline substance comprising mixture of a hydroxide, aqueous ammonia and an alkaline organic amine for controlling the pH value of the electrophoretic coating to be greater than 7 to less than or equal to 11 for negatively charging the film-forming resin,
   wherein the alcohol solvent is a C2-C6 alkyl alcohol, the ether solvent is an aliphatic diol monoether solvent, and wherein a volume ratio of the alcohol solvent to the ether solvent is in a range of 3:1 to 10:1.

16. The electrophoretic coating of claim 15, wherein the electrophoretic coating does not use a crosslinking agent in its formation.

17. The electrophoretic coating of claim 15, wherein a volume ratio of the water-miscible solvent to the water is in a range of 10:90 to 30:70.

18. The electrophoretic coating of claim 15, wherein the film-forming resin has a molecular weight between approximately 9,000 and 14,000.

19. The electrophoretic coating of claim 15, wherein the film-forming resin has a molecular weight of approximately 10,000.

20. The electrophoretic coating of claim 15, wherein a weight ratio of the water-miscible alcohol solvent and the water-miscible ether solvent to the film-forming resin is in a range of 2:1 to 4:1.

* * * * *